United States Patent [19]
Kelman

[11] Patent Number: 5,536,341
[45] Date of Patent: Jul. 16, 1996

[54] SOFT PANEL WITH THERMOPLASTIC FIBER CLUSTER LAYER

[75] Inventor: Josh Kelman, Dover, N.H.

[73] Assignee: Davidson Textron Inc., Dover, N.H.

[21] Appl. No.: 299,600

[22] Filed: Sep. 1, 1994

[51] Int. Cl.⁶ .............................. D04H 3/12; B27N 5/00
[52] U.S. Cl. ................. 156/62.2; 156/283; 156/285; 264/121; 264/122; 264/517; 425/80.1
[58] Field of Search ................... 156/62.2, 283, 156/285, 279; 264/121, 126, 517, 122; 425/80.1

[56] References Cited

U.S. PATENT DOCUMENTS

| | | | |
|---|---|---|---|
| 3,063,883 | 11/1962 | Brisette | 154/43 |
| 3,170,197 | 2/1965 | Brenner | 19/148 |
| 3,193,440 | 7/1965 | Schafer | 156/62.2 X |
| 4,794,038 | 12/1988 | Marcus | 264/121 |
| 4,938,906 | 7/1990 | Brault | 264/163 |
| 5,093,059 | 3/1992 | Nathoo et al. | 264/121 |
| 5,147,653 | 9/1992 | Nelson | 425/470 |
| 5,169,580 | 12/1992 | Marcus | 264/115 |
| 5,217,672 | 6/1993 | Kelman et al. | 264/517 |
| 5,225,261 | 7/1993 | Kargarzadeh | 428/60 |
| 5,229,052 | 7/1993 | Billiu | 264/115 |
| 5,336,455 | 8/1994 | Kelman | 264/113 |

*Primary Examiner*—Michael W. Ball
*Assistant Examiner*—Sam Chuan Yao
*Attorney, Agent, or Firm*—Reising, Ethington, Barnard & Perry

[57] ABSTRACT

A soft panel has a layer formed from thermoplastic fiber clusters comprised of a very high percentage of crooked matrix fibers and a very low percentage of crooked binder fibers with a lower melt temperature and wherein the fibers have a plurality of bends that entangle the fibers together in the clusters. The fiber clusters are blown onto a first foraminous screen that defines a retainer side of the fiber layer and through which air is being drawn. A layer of thermoplastic powder is sprayed onto a thermoplastic veil draped over the fiber cluster layer while the latter remains on the first screen and air is drawn through this screen and the veil to retain the powder layer in place. A hot shell skin tool is then applied to the powder to form a flexible skin fused to the fiber cluster layer. The fiber cluster layer with the flexible skin joined thereto is then adhered on its retainer side to a preformed rigid retainer to complete the panel. A soft panel is also formed by adhering the fiber cluster layer to a preformed flexible skin as well as to a preformed rigid retainer.

13 Claims, 5 Drawing Sheets

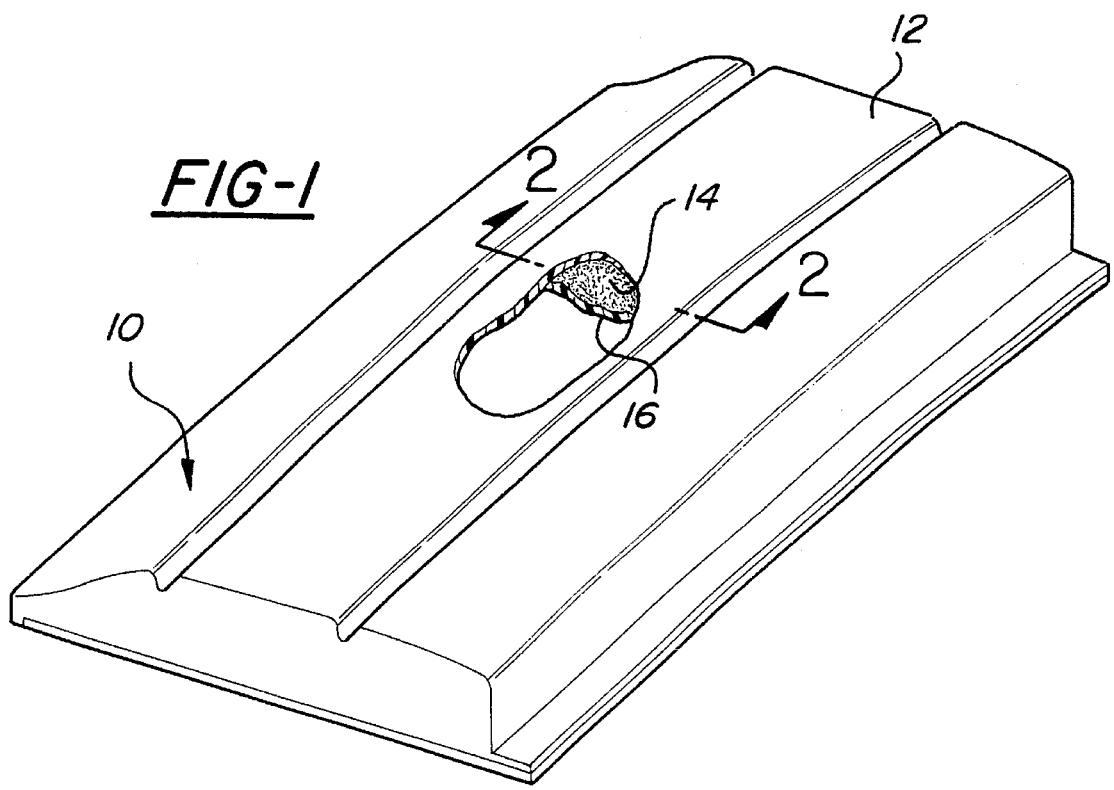
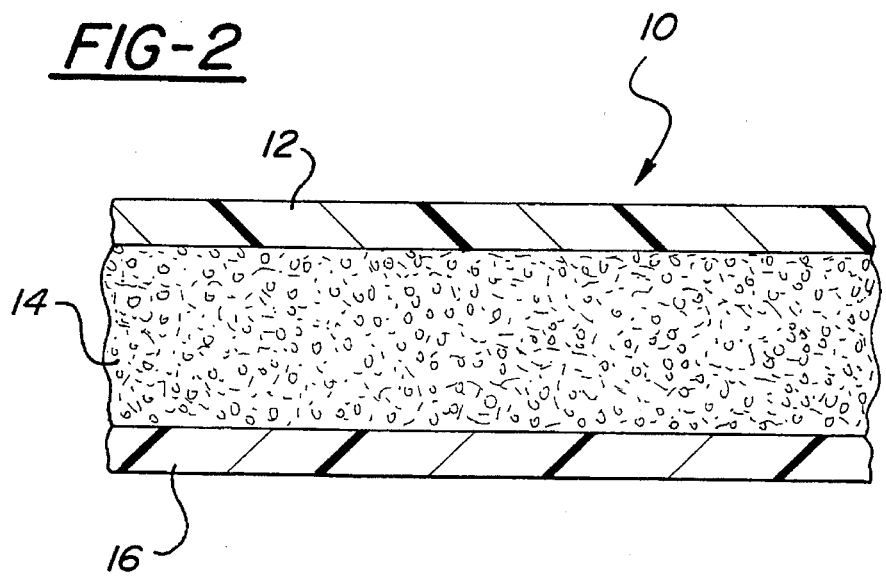

SOFT PANEL WITH THERMOPLASTIC FIBER CLUSTER LAYER

TECHNICAL FIELD

This invention relates to panels having a flexible skin with a soft backing and more particularly to the formation of a soft panel having a flexible skin with a soft springy fiber cluster layer and a rigid retainer.

BACKGROUND OF THE INVENTION

Where it is desired to have a panel such as a motor vehicle interior panel that is soft and resilient, a soft springy material such as plastic foam is commonly employed as a backing for a flexible skin having the desired visual appearance. Fiber batting and fiber preforms made of chopped fibers are also used as the skin backing but to a far lesser degree as they do not possess the soft feel and low spring rate that can be obtained with plastic foam. For processing and other reasons, the foam is commonly made of a thermosetting plastic and while having the above desired attributes, it does have the disadvantage of not being recyclable which is of continuously growing importance. A fiber backing for the flexible skin made of recyclable thermoplastic fibers would be more desirable if such could be provided with spring characteristics comparable to foam on a cost competitive basis. The difficulty resides in combining the fibers in some form and/or manner that will provide and retain a soft springy characteristic when layered between the flexible skin and the rigid retainer.

In the case of fiber batting, the fibers are normally substantially straight and are woven together to form the batting or gathered and held together in an unwoven layered manner to form the batting. In either case, they do not lend themselves to producing a consistent or uniform soft springing action co-extensive with the skin because of their beam like characteristic and bending stiffness. Furthermore, the batting fibers are typically compacted while being bonded or adhered to the flexible skin and this produces an interface stiffness in addition to a structural stiffness that significantly limits the degree of softness that can be felt at the flexible skin.

In the case of a fiber preform, the primary difficulty also resides in stiffness. For example, in making such a preform, it is common practice to spray a layer of chopped fibers onto a foraminous screen through which air is being drawn. The chopped fibers may be precoated with a heat activated binder or the fibers may include binder fibers or a thermoplastic powder may be blown onto the deposited fibers. The chopped fibers are normally substantially straight, are deposited in random orientation on the screen, and are then bonded together with the application of heat to retain the shape of the screen. The chopped fibers on bonding together form a multitrussed structural network of short straight fibers with the result that the chopped fiber preform is relatively stiff and can not be made as soft as foam in forming a springy backing for a flexible skin.

SUMMARY OF THE INVENTION

The present invention offers a soft panel having a fused thermoplastic fiber cluster layer that is soft and springy in a consistent uniform manner throughout and imparts a uniform soft resilient feel to a flexible skin that is similar to that provided by a foam material and is far superior to that provided by fiber batting and a preform formed with plain chopped fibers. In the present invention, thermoplastic fiber clusters rather than individual chopped fibers are blown onto an inner foraminous screen that defines the shape of the retainer side of the backing and through which air is being drawn. The fiber clusters comprise a very high percentage by weight of crooked thermoplastic matrix fibers having a high melt temperature and a very low percentage by weight of crooked thermoplastic binder fibers having a low melt temperature. The individual fibers have a plurality of crooks or bends that entangle with those of other fibers in the cluster to self retain the fibers together in their clusters in a clinging manner. Moreover, the bends impart to the fibers a spring characteristic. The self retention of the bent fibers is utilized to hold them together in their respective clusters against the screen and prevents them from being individually drawn or blown through the screen as can occur to a significant degree with individual plain chopped fibers. In the event some of the fibers are nevertheless caused to leave their cluster because of the forced air flow, the bends in these fibers then act to prevent their individual passage through the screen.

Following the depositing of the fiber clusters on the inner screen in a uniform layer of prescribed thickness determined by the ultimate fiber cluster density and soft feel desired, a second outer foraminous screen that defines the shape of the skin side of the fiber layer is then applied to compact the fiber clusters between the two screens to establish the desired shape or form of the fiber cluster layer and final fiber cluster density. Air heated to the melt temperature of the binder fibers is then circulated through the compacted fiber clusters between the screens to melt the binder fibers to fuse the matrix fibers together where they contact with others in their cluster and with those in adjacent clusters to create a fused fiber cluster layer conforming to the shape of the screens and wherein the fiber cluster layer has a soft springy characteristic or property similar to foam provided by the bends in the fused matrix fibers. The matrix fibers are uniformly distributed throughout the fiber layer and as a result, the fiber cluster layer has a substantially consistent or uniform soft springy characteristic throughout that is well suited to support a flexible skin to provide the latter with a feel that is soft and resilient to the touch. Moreover, few if any of the matrix fibers in the clusters extend in exactly the same direction and their multidirectional and distributed springing action has been found to provide a new kind of soft feel at the overlaying flexible skin. This feel is Similar to that obtained with the typical foam backing from the standpoint of resilience and is quite different and far superior to previous fiber backings with their inconsistent and relatively stiff structural network of fibers.

As compared with foam wherein the softness is governed by the foam chemistry, the morphology of the fiber cluster layer can be altered to change its spring properties in many different mechanical ways. For example, the structural properties of the fiber cluster backing can be altered by changing the fiber diameter, the fiber length, the cluster size and the number of crooks or bends in the fibers. Other advantages with respect to foam include lower part cost, lower tooling cost, no need for trimming, lower start-up costs, and the ability to provide an even softer feel. These advantages are especially valuable for the making of automotive interior panels such as instrument panels and door panels.

Using the above processed soft fiber cluster layer, a flexible thermoplastic skin is then formed integral therewith by removing the outer foraminous screen and draping a thermoplastic veil over the fused fiber cluster layer while the latter remains on the inner foraminous screen. A layer of thermoplastic powder is then sprayed onto the veil and held in place by drawing air through the fiber cluster layer and the inner screen. A heated shell Skin tool is then applied to the layer of powder to melt the powder and the veil to form a flexible skin fused to the skin-side surface of the fused fiber cluster layer. The fiber cluster layer with the thus formed integral flexible skin is then separated from the skin tool and the inner screen and the retainer-side of the fused fiber cluster layer is adhered to a preformed rigid retainer to complete the formation of the panel. A soft panel is also formed by adhering the soft fiber cluster layer to a preformed flexible skin as well as a preformed rigid retainer.

In a preferred form for automotive interior panels, the soft panel of the present invention is made of a singular thermoplastic material to aid recycling. For example, the skin, fiber cluster backing and the retainer can all be made of polyethylene terephthalate in which case no material separation is required in recycling the material used to form the panel.

It is therefore an object of the present invention to provide a new and improved soft panel with a fiber layer and a method of making same.

Another object is to provide a soft panel having a flexible skin with a soft springy fiber cluster layer and a method of making same.

Another object is to provide a soft panel having an integral flexible skin and a soft springy fiber cluster layer and a method of making same.

Another object is to provide a soft panel having a flexible skin formed from thermoplastic powder on a preformed soft springy fiber cluster layer that becomes integral therewith and a method of making same.

Another object is to provide a panel having a flexible skin that is preformed and adhered to a preformed soft springy fiber cluster layer and a method of making same.

Another object is to provide an interior automotive panel comprising a flexible skin, a fused fiber cluster layer and a retainer all formed of a singular thermoplastic material to aid in recycling the material used to form the panel.

Another object is to provide an interior automotive panel comprising a skin, a fused fiber cluster layer and a retainer all formed of a singular thermoplastic material such as polyethylene terephthalate.

These and other objects, advantages and features of the present invention will become more apparent from the following description and drawing wherein:

BRIEF DESCRIPTION OF THE DRAWINGS

FIG. 1 is a perspective view, with parts broken away, of a panel made according to the present invention;

FIG. 2 is an enlarged partial sectional view taken along the line 2—2 in FIG. 1 when looking in the direction of the arrows;

DETAILED DESCRIPTION OF THE DRAWINGS

Figure 3:
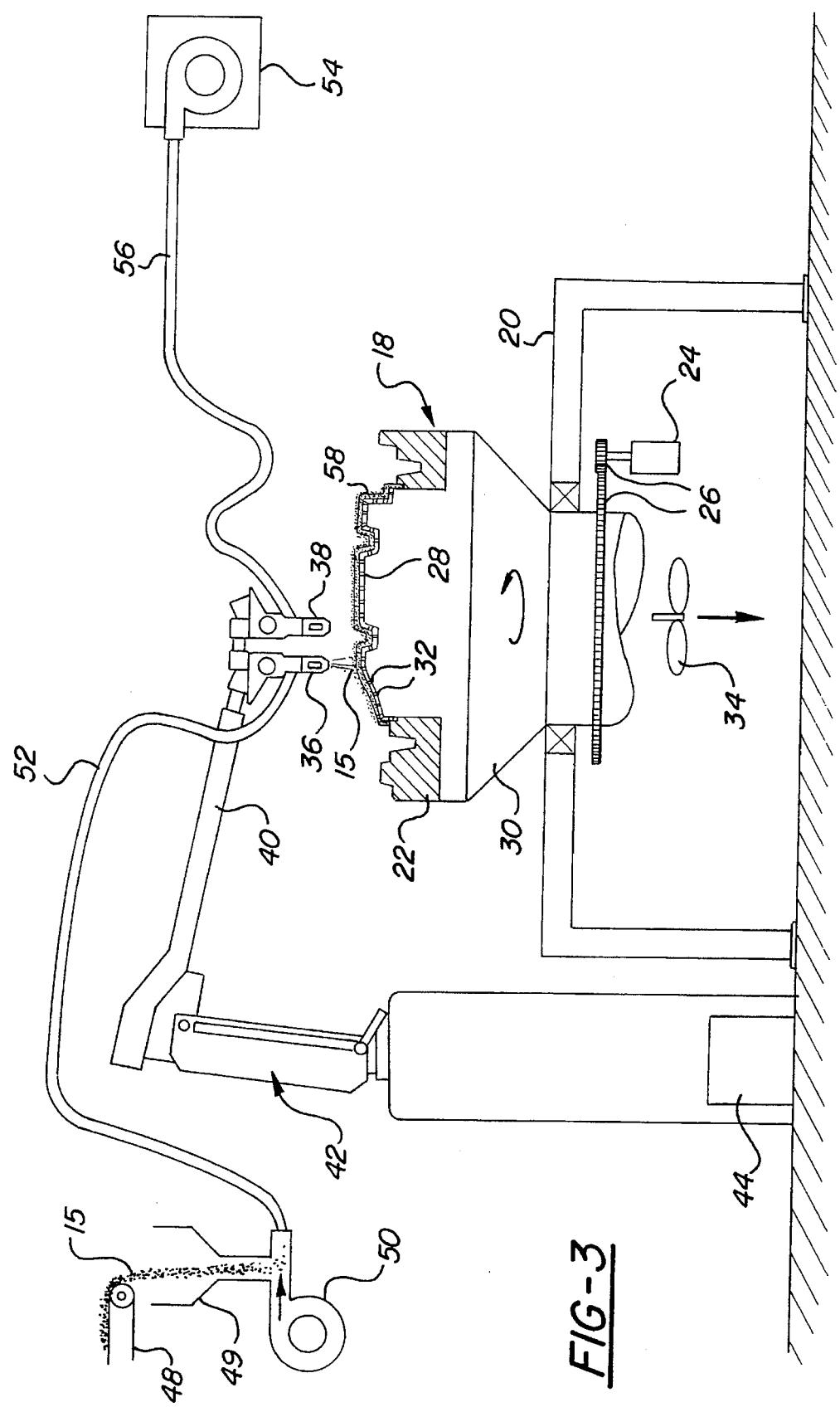
FIG. 3 is a schematic view of apparatus for forming the fiber cluster layer and skin of the panel in FIG. 1.

Referring to FIGS. 1 and 2, there is illustrated a soft interior panel 10 with a complex curved contour adapted for installation in a motor vehicle. The panel is of thin, lightweight construction and comprises a soft, thin, flexible skin 12 formed from a thermoplastic powder; a soft, resilient, compacted and fused fiber cluster layer or skin backing 14 formed from thermoplastic fiber clusters 35 (see FIG. 5); and a rigid retainer or insert 16 formed from a thermoplastic material. The retainer provides support in the panel for the fiber cluster layer and the skin and is adapted to be mounted in a motor vehicle to form a part of the interior surface.

Referring to FIG. 3, there is illustrated apparatus for making both the fiber cluster layer 14 and the skin 12. The apparatus includes a rotary screen assembly 18 that is mounted on a platform 20. The rotary screen assembly 18 includes a rotary table 22 that is driven at a constant slow speed by a motor 24 through gearing 26 or other suitable drive means. An inner foraminous screen 28 for forming the retainer side of the fiber cluster layer 14 is mounted in a horizontal position on the table for rotation therewith about a vertical axis. The screen 28 is sealingly secured about its periphery to the table and is open on its underside to a suction duct 30. The suction duct 30 is fixed to rotate with the table 22 as illustrated or it may be separate therefrom and mounted in a stationary manner with respect to the rotary screen assembly. The screen 28 has uniformly spaced round holes 32 throughout and a curved contour that is the exact opposite of the desired retainer-side shape of the fiber cluster layer 14. A suction fan 34 is located in the suction duct 30 and is operable to draw air through the center of the rotary screen assembly 18.

Figure 7:
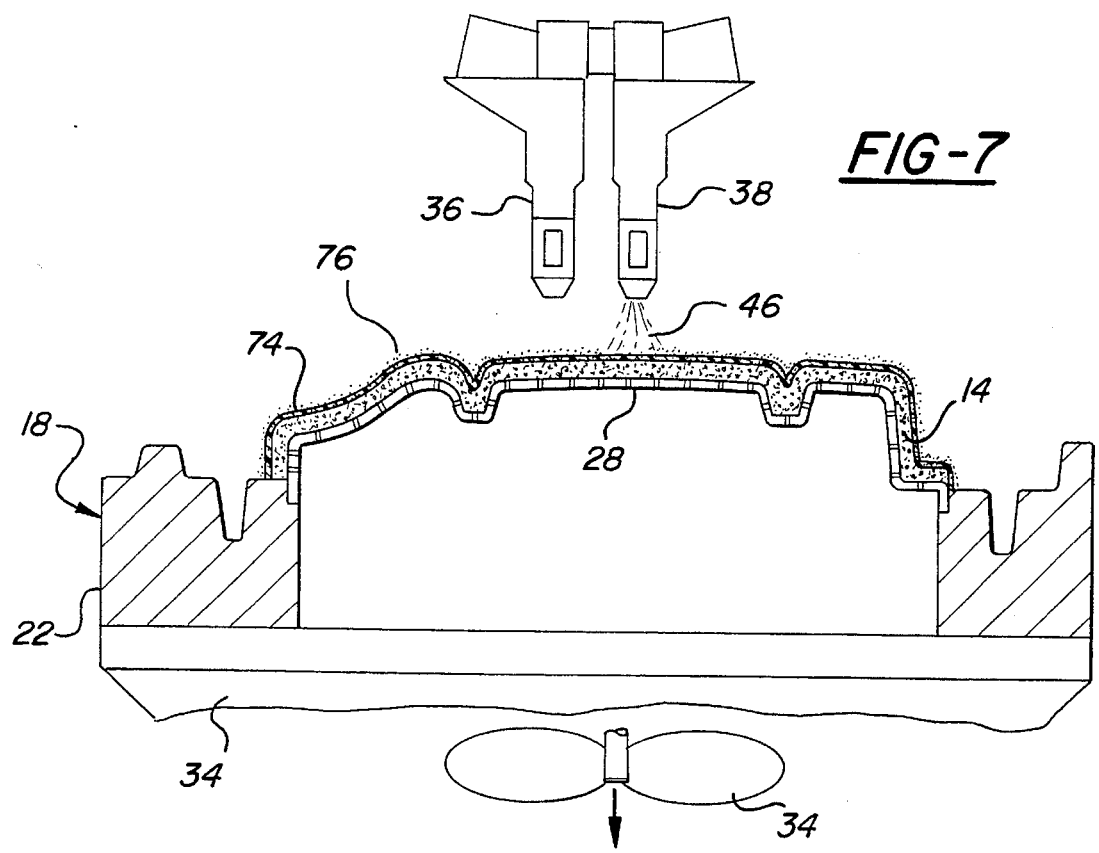
FIG. 7 is a schematic view illustrating the apparatus in FIG. 1 spraying thermoplastic powder to form the skin on the fiber cluster layer in FIG. 6.

Both a fiber cluster spray nozzle 36 and a skin powder spray nozzle 38 are mounted on the arm 40 of a robot 42. The robot is controlled by a computer 44 that is programmed to track the screen 28 with the nozzles 36 and 38 in a certain pattern as the screen rotates to evenly deposit a layer of the fiber clusters 15 on the screen 28 with the nozzle 36 as illustrated in FIG. 3 and then later evenly deposit a layer of skin forming thermoplastic powder 46 with the nozzle 38 as illustrated in FIG. 7.

The fiber clusters 15 for forming the layer 14 are fed at a controlled rate by a conveyor 48 to a hopper 49 from which they are forced by air from a blower 50 and through a flexible hose 52 to the fiber cluster spray nozzle 36. The skin powder spray nozzle 38 is supplied with the thermoplastic powder 46 to form the skin 12 from a fluidized bed powder system 54 that is connected with the nozzle by a flexible hose 56.

Figure 5:
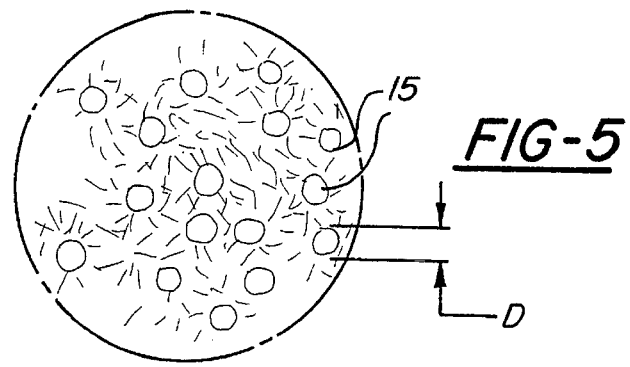
FIG. 5 is an enlarged view of the fiber clusters used to make the fiber cluster layer

Referring to FIG. 5, the thermoplastic fiber clusters 15 are of a type that is commercially available from E. I. DuPont De Nemours and Company. They are of substantially uniform shape and size and comprise a mixture of matrix fibers and binder fibers that are bent or crooked. The matrix fibers constitute about 90% by weight of each cluster and have a relatively high melt temperature and the binder fibers constitute the remaining about 10% by weight of each cluster and have a relatively low melt temperature. The fibers may be of the thermoplastic styrenic, olefine or polyester family and are preferably PET (polyethylene terephthalate) fibers wherein the matrix fibers are formulated with a melt temperature of about 480° F. and the binder fibers are formulated with a much lower melt temperature of about 300° F.

The individual matrix fibers and binder fibers are bent or made crooked in their processing so as to each have a plurality of bends whereby the matrix fibers in particular are in effect miniature thermoplastic fiber springs. The matrix fibers and the binders fibers are then mixed in the above proportion (about nine matrix fibers for every binder fiber) and formed into a generally spherical or ball shape having a mean diameter D as illustrated in FIG. 5. The clusters are maintained together in this form by the bends in their fibers entangling with those of other fibers in their cluster and as a result the individual fibers by their clinging together strongly resist their dislodging from their cluster by an air stream. The mean diameter D of the fiber clusters is preferably about four times the diameter of the screen holes 32 to assure that they can not be forced therethrough by the air flow through these holes. In the embodiment illustrated, the fiber clusters 15 have a mean diameter D of about one-fourth inch and the screen holes have a diameter of 1/32 of an inch.

Describing now the method of making the fiber cluster layer 14 and referring first to FIG. 3, the processing is commenced by activating the rotary table 22, suction fan 34, robot 42 and blower 50. The fiber clusters 15 are delivered at a suitable controlled rate by the feed conveyor 48 and blown through the hose 52 to the nozzle 36. The fiber clusters at the controlled feed rate are then blown by the nozzle 36 in a uniform spray pattern onto the surface of the screen 28 as it rotates on the table 22. Meantime, air is being drawn through the screen holes 32 by the suction fan 34 to suction or draw the blown fiber clusters onto the screen and hold them thereon and prevent them from passing by as waste. The horizontal positioning of the rotary screen assembly provides for the effect of gravity to generally assist in spraying the fiber clusters evenly onto the horizontal screen 28 rather then being continuously deflected in a sideways or transverse manner by gravity if the rotary screen assembly was in a vertical position and rotating about a horizontal axis. The robot computer 44 is programmed in relation to the feed rate of the fiber clusters, the speed of the rotary table, and the contour of the screen 28 at a starting reference point so as to position the nozzle 36 with the robot arm 40 to track the surface of the screen in a manner that deposits a layer 58 of the fiber clusters thereon of substantially uniform thickness. The computer is also programmed to maintain the nozzle 36 at substantially right angles to the surface of the screen directly opposite the nozzle as much as possible to help in uniform distribution of the fiber clusters onto the screen. The thickness of the fiber cluster layer is variable and depends on the fiber density desired and wherein there may be only one fiber cluster constituting its thickness or a plurality of the fiber clusters constituting its thickness as illustrated. While such processing of the fiber cluster layer has been demonstrated with rotation of the rotary table, it will be understood that the robot could also be programmed to direct the fiber clusters onto the foraminous screen while it is stationary.

Figure 4:
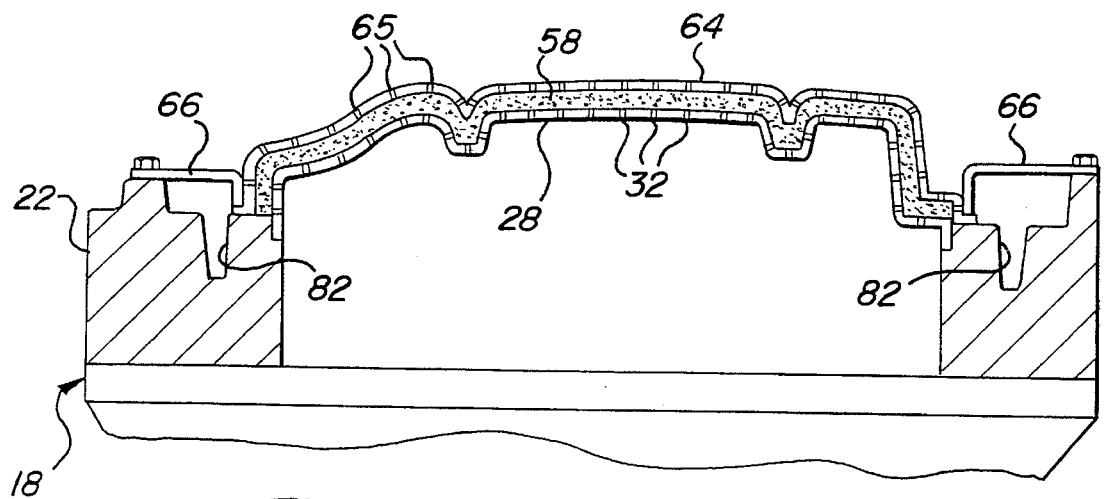
FIG. 4 is a partial view from FIG. 3 illustrating additional apparatus for making the fiber cluster layer.

When the desired layer of fiber clusters has been deposited onto the screen 28, the feed conveyor 48 and blower 50 are stopped and the robot arm with the nozzles 36 and 48 is moved out of the way while the suction fan 34 remains active to tightly hold the deposited layer of fiber clusters in place on the screen. At this point the rotary table 22 is stopped if it has been rotated in the depositing of the fiber clusters and an outer foraminous screen 64 is added as illustrated in FIG. 4 to compact the deposited layer 58 of fiber clusters to a desired density as predetermined by the thickness of the deposited layer of fiber clusters and to also define the desired shape on the skin side of the fiber clusters. For the latter purpose, the screen 64 has a curved contour that is the exact opposite of the desired skin-side shape of the fiber layer 14. The outer screen 64 has holes 65 like the screen 28 and is secured to the table by bolted clamps 66 or other suitable means to maintain the fiber clusters in this compacted state for their fusing together.

Figure 6:
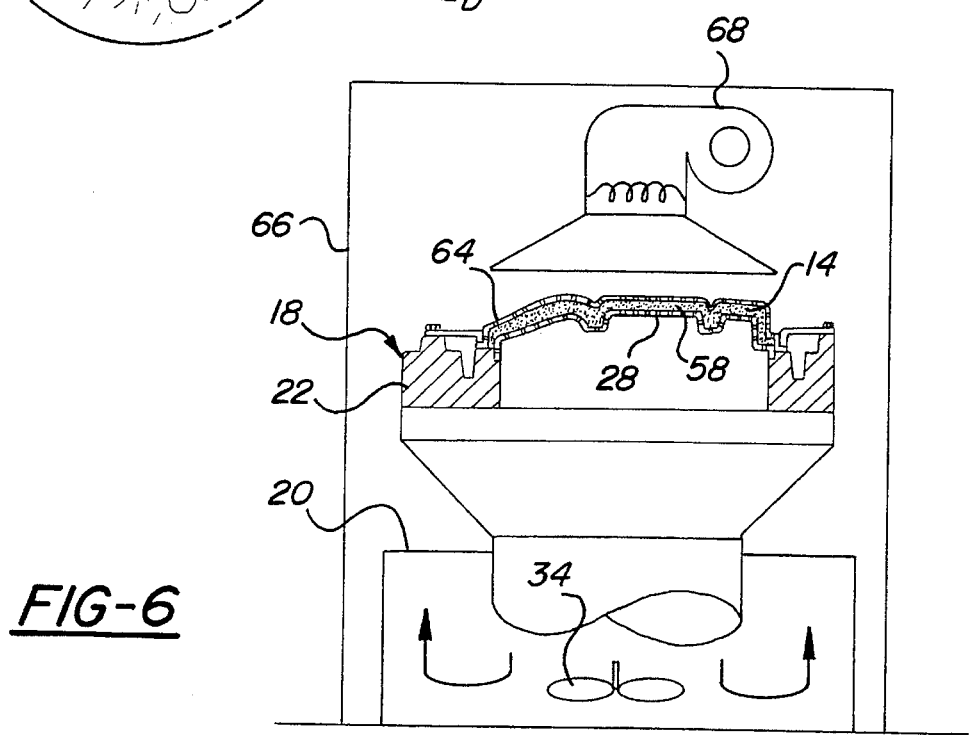
FIG. 6 is a schematic view of apparatus for heating the fiber clusters to form the fiber layer.

The rotary screen assembly 18 including the two foraminous screens 28 and 64 with the layer 58 of fiber clusters compacted there between is then placed in an oven 66 as illustrated in FIG. 6. The oven includes an overhead mounted, downwardly directed, forced air heater 68 that is then activated to blow hot air through the fiber clusters to melt the binder fibers. The temperature of the heated air is set at a figure intermediate the melt temperatures of the binder fibers and matrix fibers to assure at least softening of all the former but avoid melting of the latter (for example 350° F. for the PET binder fibers identified above whose melt temperature is 300° F.). The suction fan 34 forces circulation of the hot air through all the screen holes to provide substantially uniform distribution of the hot air throughout all the clusters for this purpose. The suction fan also functions to recirculate the heated air back to the heater 68 as illustrated by the arrows and maintain an even heat in the oven to help melt the binder fibers quickly. When the binder fibers have melted, the heater 68 is turned off and the rotary screen assembly 18 is removed from the oven 66.

On the melting of the binder fibers, their melt fuses the bent matrix fibers where they touch each other in their cluster and with those in the immediately adjacent clusters and as a result all the deposited matrix fibers in the clusters are fused together to create the compacted fiber cluster layer 14 wherein the shape thereof is co-operatively defined by the two foraminous screens 28 and 64. The bent matrix fibers after fusing together at various points are left with springy bends that provide the resulting layer 14 with a soft resilient or springy property that exists throughout. A typical thickness of the fiber cluster layer 14 as thus formed is about 4.0 to 12.0 millimeters. And the spring property can be varied or altered significantly by changing the matrix fiber diameter, matrix fiber length, cluster density, and the number of the matrix fiber bends wherein the softness increases (spring rate decreases) with decreasing matrix fiber diameter, increasing matrix fiber length, decreasing fiber cluster density, and increasing number of matrix fiber bends. Moreover, the fiber cluster layer 14 can be made as soft or even significantly more softer than the typical foam. For example, a typical foam has a softness measurement of about 15 Shore A durometer without skin and about 70 Shore A durometer with a skin covering. The fused fiber cluster layer 14 can be made with a softness that is the equal thereof or even significantly softer with a softness measurement of about 5 Shore A durometer without skin and about 30 Shore A durometer with skin with the latter being obtained from using a matrix fiber diameter of about 0.010 inches, a matrix fiber length of about 2.0 inches, a fiber density of about 6.0 pounds per cubic foot, and about 15 bends per matrix fiber.

Following the formation of the fiber cluster layer 14, it is then employed as an integral part of the process with the rotary screen assembly 18 in producing the skin 12 from sprayed thermoplastic powder as illustrated in FIG. 7. Following removal from the oven 66, the outer or skin-side screen 64 is removed from the fused fiber cluster layer 14 and a thermoplastic veil 74 is draped there over having a mesh size that blocks passage of the thermoplastic powder used to form the skin and is meltable at least in part with the thermoplastic skin powder. The veil has a typical thickness of about 0.10 to 0.50 inches and the skin powder and the veil are also of the thermoplastic styrenic, olefine or polyester family and preferably PET the same as the preferred fiber clusters.

The veil in one preferred form is entirely made of nonwoven thermoplastic fibers with a melt temperature substantially the same as the skin powder so as to melt entirely therewith and fuse with the skin powder to the fused fiber cluster layer 14 on the application of a hot skin forming tool to a layer of the skin powder as described later. In another preferred form, the veil comprises nonwoven thermoplastic fibers having a relatively high melt temperature compared to the skin powder that are coated with a thermoplastic powder that is the same as or is substantially the equivalent of the skin powder. With this form of veil, the powder coating on the veil fibers melts with the skin powder to fuse the veil fibers to the fiber cluster layer and also joins with the skin powder in the skin powder melt to fuse these fibers with the skin formed from the powder to thereby securely bond the skin to the fiber cluster layer at their interface. Veils of the above types are commercially available from Harodite Finishing Company and Kuplan-Simon Company.

Describing now the formation of the skin 12, the robot 42 is controlled by the computer 44 in conjunction with the fluidized bed powder delivery system 54 to operate the nozzle 38 to spray the thermoplastic powder in a generally downward direction onto the veil 74 in a uniform manner with respect to the surface of the fiber cluster layer 14 as it turns with the table 22 and while the suction fan 34 is activated. The suction fan now draws air through the veil 74, the fiber cluster layer 14 and the inner screen 28 and draws or suctions the powder sprayed from the nozzle 38 onto the veil to prevent fly by waste and assist in evenly distributing same on the veil. Moreover, the suction air then holds the sprayed powder in place on the veil while the latter prevents the powder from entering the interstices of the fiber cluster layer. The nozzle 38 is guided by the robot by programming of the computer 44 to track the skin side of the fiber cluster layer 14 so as to deposit a layer 76 of powder of uniform thickness on the veil 74 overlaying the entire surface of the fused fiber cluster layer 14. The computer is also programmed to maintain the nozzle 38 at substantially right angles to the surface of the fused fiber cluster layer directly opposite the nozzle to help in uniform distribution of the skin powder onto the veil. The horizontal positioning of the rotary screen assembly provides for the effect of gravity to generally assist in spraying the powder evenly onto the veil rather then being deflected in a sideways or transverse manner by gravity if the rotary screen assembly was in a vertical position and rotating about a horizontal axis. And like the blowing of the fiber clusters, the robot may also be programmed to evenly deposit the powder layer while the rotary table is stationary.

Figure 8:
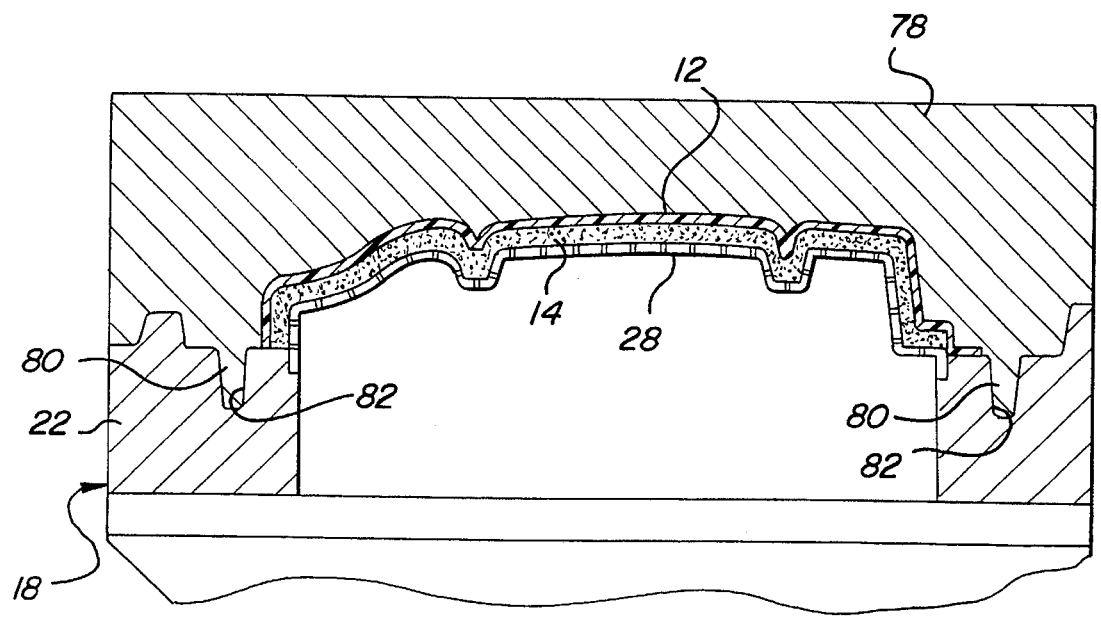
FIG. 8 is a schematic view illustrating apparatus for forming the skin from the sprayed thermoplastic powder in FIG. 7.

While the suction fan remains activated to hold the layer of powder in place and the rotary screen assembly is stationary, a hot nickel surfaced skin tool 78 is then employed to form the skin as illustrated in FIG. 8. The skin tool 78 has a surface forming contour that is the exact opposite of the desired outer side of the skin and is grained to impart a desired surface texture. The skin tool 78 is heated to the melt temperature of the skin powder and is applied to the layer of powder 76 to heat same to its melt temperature whereafter the tool is cooled to allow the melt to solidify and form the flexible skin 12. A typical thickness of the skin as thus formed is about 20 to 60 millimeters starting with a powder layer thickness of about 60 to 200 millimeters. To properly align the skin tool with the layer, guide pins 80 are provided on the skin tool that are received in piloting holes 82 in the rotary table.

On the application of heat to the skin powder with the hot skin tool, the veil is also heated sufficiently to melt and form a bond between the skin formed from the skin powder melt and the fibers at the skin-side surface of the fiber cluster layer. In the one form where the veil is made entirely of thermoplastic binder fibers having substantially the same melt temperature as the skin powder, these fibers all melt with the skin powder and fuse with the resulting flexible skin 12 to the extremity of the fused matrix fibers in the fiber cluster layer 14 at their interface. In the other preferred form of the veil, it will be recalled that the veil is made of thermoplastic fibers having a melt temperature higher than the skin powder and wherein the fibers have a powder coating that melts at the temperature of the skin powder. In this case, the powder on the veil fibers melts with the skin powder from the heat of the skin tool and fuses the veil fibers to the skin formed from the skin powder and to the fused fiber cluster layer. In the latter instance, only a part of the veil is thus melted in the process of bonding the skin to the fiber cluster layer and the veil fibers remain at their interface as a strengthening link in the bond between the flexible skin and the fused fiber cluster layer.

After curing, the skin 12 and fiber cluster layer 14 become one integral piece and are removed from between the skin tool 78 and screen 28 of the rotary screen assembly. The rigid retainer 16 is a preformed part made in a conventional manner and the retainer or back side of fused fiber cluster layer 14 is then adhered to the rigid retainer 16 with a suitable adhesive. The rigid retainer may be made of any suitable stiff material including plastic and metal but is preferably made of the same thermoplastic polymer as the fiber clusters, the skin and the veil for recyclability and to provide a common thermoplastic processing system in manufacturing the panel. When made of thermoplastic material, the retainer has a typical thickness of about 0.120 inches. Examples of suitable adhesives for bonding the rigid retainer to the fused fiber cluster layer include powdered polyester and polyurethane.

Figure 9:
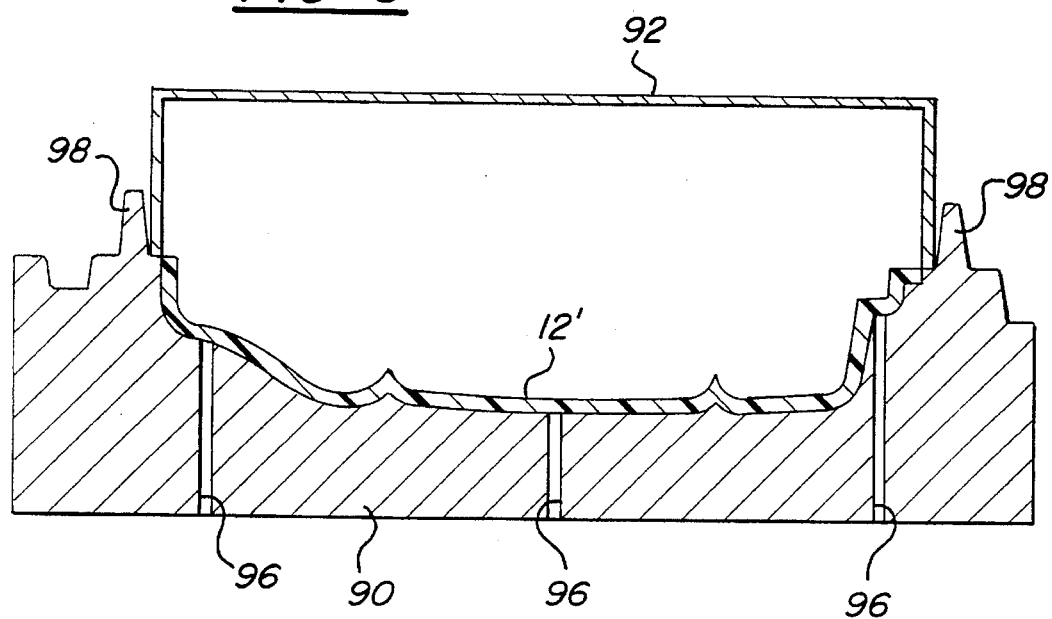
FIG. 9 is a schematic view of apparatus for preforming the skin for the panel in a casting process.
Figure 10:
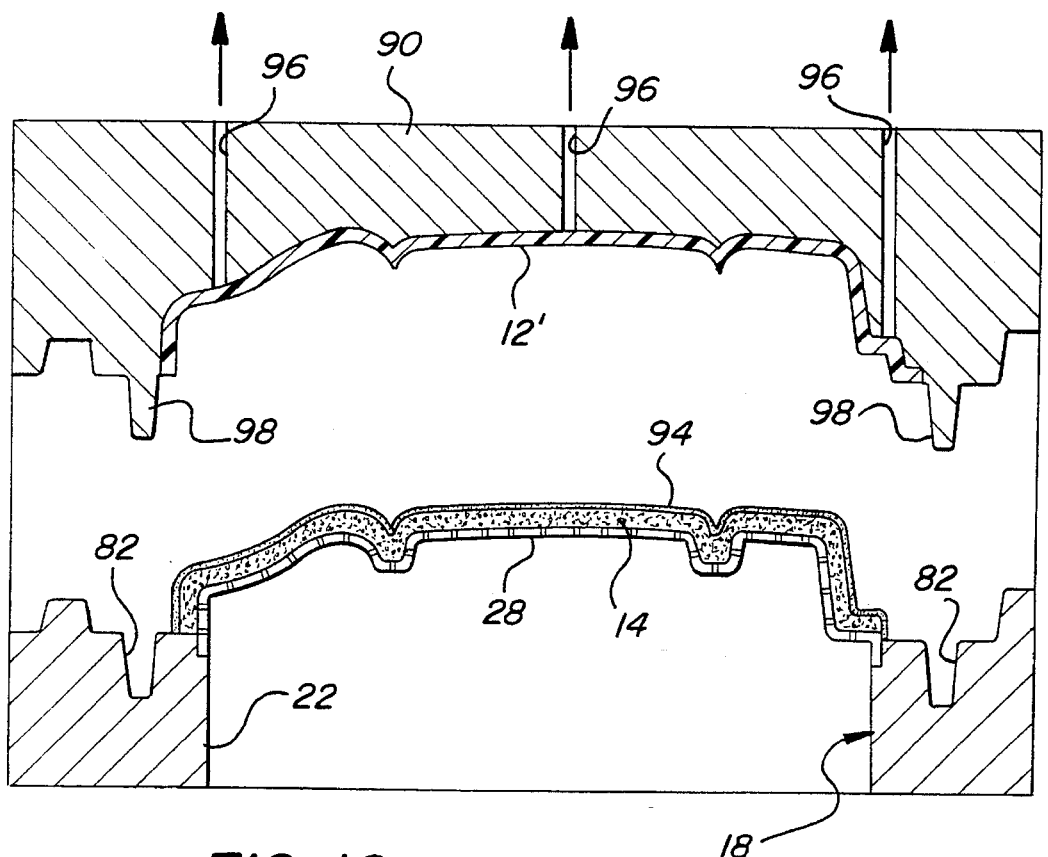
FIG. 10 is a schematic view of apparatus for applying the preformed skin in FIG. 9 to the fiber cluster layer in FIG. 6.

Following the formation of the fused fiber cluster layer 14, it may also be used to produce a modified form of the soft panel wherein the skin is cast in a conventional manner with a shell mold 90 and powder box 92 illustrated in FIG. 9 or vacuum formed in a conventional manner. In the casting process, the skin forming contour of the shell mold 90 is the same as the skin tool 78 and the powder box 92 is charged with a measured quantity of the thermoplastic powder. The shell mold is then clamped to the box while the latter is inverted and the shell mold is heated. The shell mold has a nickel coated mold surface and when it reaches the melt temperature of the powder, the shell mold and box are turned over casting the powder onto the hot shell mold. A skin 12' is then formed from the powder on the hot shell mold and the powder box is removed. Referring to FIG. 10, a heat activated adhesive 94 for bonding the skin 12' is applied to the skin side of the fiber cluster layer 14 while it remains on the screen 28 in the rotary screen assembly 18 like in the formation of the skin from the thermoplastic powder. Examples of suitable heat activated adhesive for bonding the preformed skin 12' to the fused fiber cluster layer 14 include a liquid hot melt adhesive material applied as a coating on the surface fibers thereof and powdered PET that is sprayed on to the fiber cluster layer from this side. Following curing of the skin 12', a vacuum is then applied through passages 96 in the shell skin mold 90 as indicated by the arrows to retain the skin in the shell mold while it is lowered in an inverted position onto the fiber cluster layer 14. The shell skin mold 90 is provided with pins 98 like those on the skin tool 78 that are received in the holes 82 in the rotary table 22 to properly align the skin 12' in the shell skin mold with the fused fiber layer 14 on the screen 28. The heat of the shell mold activates the adhesive 94 which then bonds the skin 12' to the surface of the fiber cluster layer 14 under the pressure of the shell mold. When the adhesive has set, the shell mold is lifted and the skin 12' with the fiber cluster layer 14 bonded thereto is then lifted from the rotary screen assembly. Following the removal of the fused fiber cluster layer 14 with the flexible skin 12' bonded thereto, the rigid retainer 16 is then adhered to the back side of the fiber cluster layer as before to complete the formation of the panel.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A method of forming a panel with a flexible skin, a soft springy fiber cluster layer, and a rigid retainer comprising the steps of:

providing fiber clusters comprised of a high percentage of thermoplastic matrix fibers that melt at a relatively high temperature and a low percentage of thermoplastic binder fibers that melt at a relatively low temperature and wherein both fibers in the clusters have a plurality of bends and are retained together by entanglement of their bends and possess a springy characteristic because of their bends, drawing air through a first foraminous screen that defines a retainer side of the fiber layer to be formed, blowing the fiber clusters onto the first foraminous screen to form a uniform layer of the fiber clusters thereon held in place by the air being drawn there through, compacting the layer of fiber clusters between the first foraminous screen and a second foraminous screen that defines a skin side of the fiber layer to be formed, forcing air heated to the melt temperature of the binder fibers through the screens and the compacted layer of fiber clusters therebetween to melt the binder fibers to fuse the matrix fibers together where they touch to create a fused fiber cluster layer having a significant springy characteristic and a shape defined by the sides of the foraminous screens, removing the second foraminous screen from the fused fiber cluster layer, bonding a flexible thermoplastic skin to the skin side of the fused fiber cluster layer while on the first foraminous screen, removing the bonded skin and fused fiber cluster layer from the first foraminous screen, and bonding a rigid retainer to the retainer side of the fused fiber cluster layer.

2. The method of claim 1 further comprising the steps of:

providing a thermoplastic powder that is meltable to form the flexible skin, applying a thermoplastic veil to the skin side of the fiber cluster layer that is impervious to the thermoplastic powder and is meltable at least in part with the powder to fuse the skin to the fused fiber cluster layer, drawing air through the first foraminous screen and fused fiber cluster layer and veil, spraying thermoplastic powder on the veil to form a layer of the powder thereon held in place by the air being drawn through the first foraminous screen and fused fiber cluster layer and veil, and applying a heated skin forming tool to the layer of powder to form a flexible skin and also melt at least a part of the veil to fuse the skin to the fused fiber cluster layer.

3. The method of claim 1 further comprising the steps of:

preforming the skin so as to conform to the skin side of the fused fiber cluster layer, and bonding the preformed skin to the fused fiber cluster layer under pressure on the first foraminous screen.

4. The method of claim 1 further comprising the step of:

using fiber clusters having a substantially uniform size.

5. The method of claim 1 further comprising the step of:

using fiber clusters having a generally spherical shape.

6. The method of claim 1 further comprising the step of:

using fiber clusters having a substantially uniform size and generally spherical shape.

7. The method of claim 1 further comprising the step of:

rotating the first foraminous screen while blowing the fiber clusters thereon.

8. The method defined in claim 1 further comprising the steps of:

orienting the first foraminous screen in a substantially horizontal position, and rotating the first foraminous screen about a substantially vertical axis while blowing the fiber clusters thereon and drawing the air therethrough.

9. The method defined in claim 1 further comprising the step of:

using fiber clusters formed of polyethylene terephthalate fibers.

10. The method defined in claim 1 further comprising the step of:

using fiber clusters comprised of about 90% by weight of matrix fibers and of about 10% by weight of binder fibers.

11. The method defined in claim 1 further comprising the steps of:

using fiber clusters, a skin and a retainer all formed of polyethylene terephthalate.

12. The method defined in claim 2 further comprising the steps of:

using a veil that melts in its entirety with the powder forming the skin to fuse the skin to the fused fiber cluster layer.

13. The method defined in claim 2 further comprising the steps of:

using a veil having thermoplastic powder that melts with the powder forming the skin to fuse the skin to the fused fiber cluster layer.

* * * * *